United States Patent [19]

Keeping et al.

[11] Patent Number: 5,576,740

[45] Date of Patent: Nov. 19, 1996

[54] CHART RECORDER HAVING REVIEW MEANS

[76] Inventors: Sean C. Keeping, 59 Kimberley Road, West Croydon, Surrey CR0 2PY; John C. Emmerson, 64 Kings Hill, Beech, Alton, Hampshire GL34 4AN; David J. Claydon, 7 West Street, Great Gransden, Sandy, Bedfordshire SG19 3AT, all of England

[21] Appl. No.: 246,358

[22] Filed: May 19, 1994

[51] Int. Cl.⁶ .................................................. G01D 15/24
[52] U.S. Cl. ............................................................ 346/136
[58] Field of Search ........................................ 346/136, 17

[56] References Cited

U.S. PATENT DOCUMENTS 3,889,275  6/1975  Miller ...................................... 346/136
4,423,412  12/1983  Flanagan ................................. 340/661

Primary Examiner—Benjamin R. Fuller
Assistant Examiner—Craig A. Hallacher
Attorney, Agent, or Firm—Hodgson, Russ, Andrews, Woods & Goodyear, LLP

[57] ABSTRACT

A chart recorder with the facility to automatically review recorded data on chart paper. This review feature is high speed and accurate, and is provided by a series of one way drive mechanisms.

These mechanisms comprise of various spools, rollers and gears. The chart paper is transferred from spool to spool.

A removable cassette houses these mechanisms. The cassette is juxtapositioned with a floating recording station. The mutual abutment of the cassette with the recording station ensures that the required tolerances between the chart paper and the pen head are achieved.

37 Claims, 7 Drawing Sheets

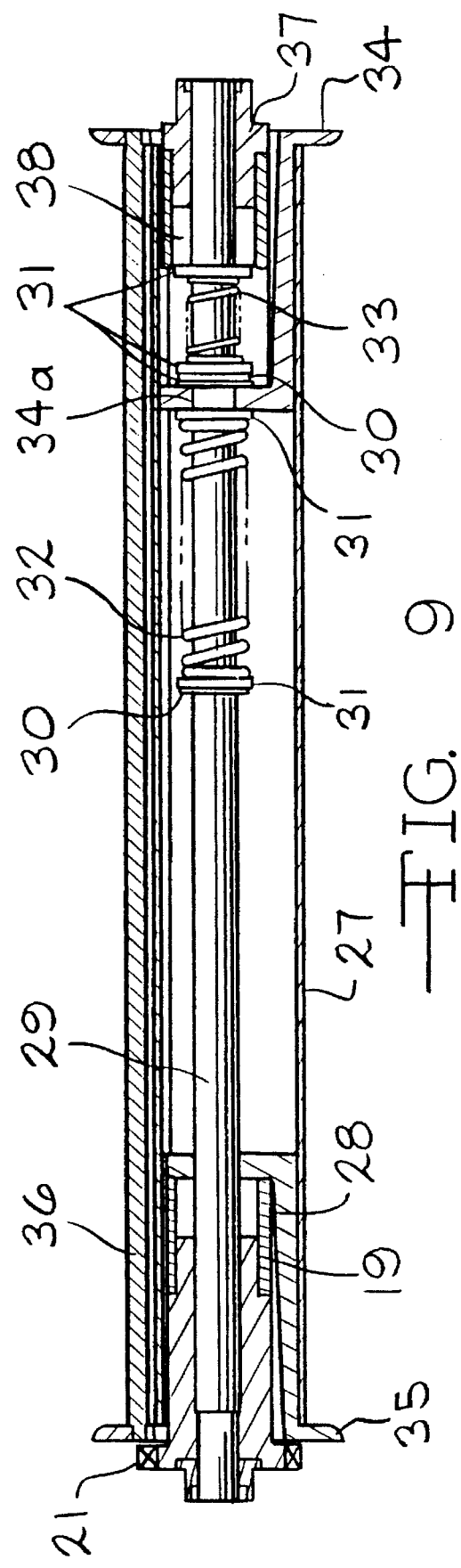
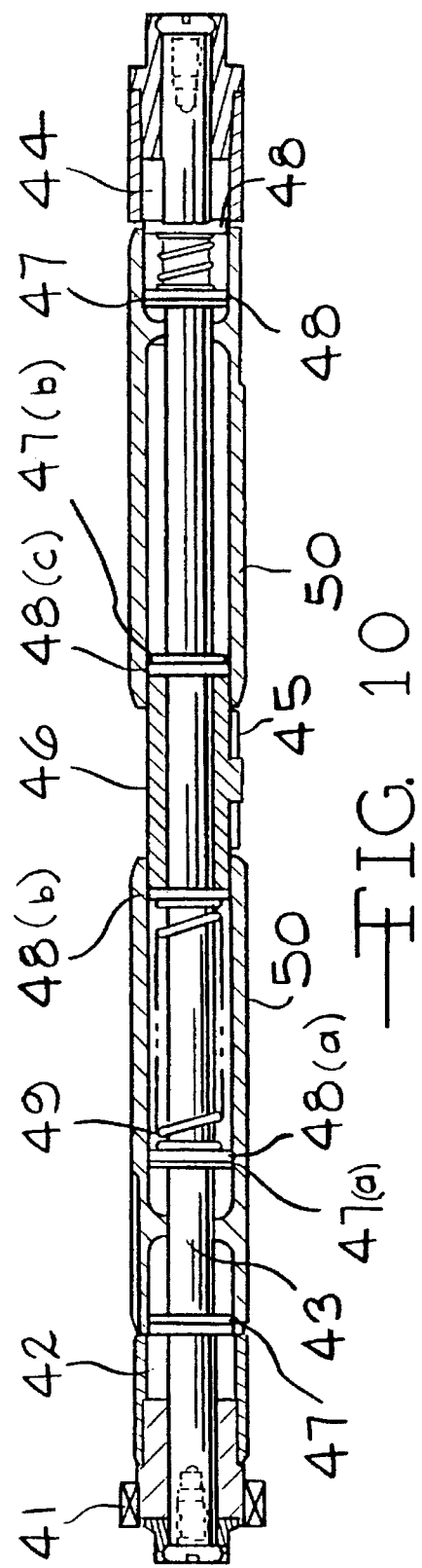
FIG. 9
FIG. 10

CHART RECORDER HAVING REVIEW MEANS

BACKGROUND OF THE INVENTION

This invention relates to chart recorders such as those in widespread use in industrial process control, and elsewhere.

Typically, a chart in roll or fan-fold form is driven at a uniform rate past a recording station at which are located one or more recording pens. Through appropriate interfaces, these recording pens are displaced transversely in a representation of data received at one or more data input ports. Optionally, alphanumeric data may also be recorded. In this way, a permanent record is achieved of key process parameters over a defined time period. Using common chart roll lengths of 15 or 30 meters and a typical chart speed for process control, it is possible to record data on a single chart covering a period of 30 or 60 days.

A chart strip, whether in roll or fan-fold form, provides accurate, long-term storage of monitored process parameters with a high degree of reliability and at relatively low cost. It is a disadvantage of charts, however, that reviewing the recorded data will necessitate careful manipulation of perhaps 15 or 30 meters of chart strip. This can be cumbersome and time-consuming whether the chart is in roll or fan-fold form.

SUMMARY OF THE INVENTION

It is one object of the present invention to provide for the convenient review of chart records.

It is a further object of the present invention to provide for such review in an improved chart recorder.

It is still a further object of the present invention to provide for such review in a chart recorder comprising a data input port; a recording station for recording a representation of data on a chart; first chart storage means; chart transport means for the uniform transport of an elongate chart strip from the first storage means past the recording station; an inspection window enabling visual inspection of a region of the chart strip bearing the recorded data representation and second chart storage means for collecting the chart strip from the recording station.

Accordingly, the present invention, in one aspect, provides in such a chart recorder, a chart review controller and chart review means operable through the chart review controller to transport the chart strip from the second to the first chart storage means, in such a manner as to bring into register with the inspection window, a selected region of the chart strip bearing previously recorded data representation for review.

In this way, the user can, without removing the chart strip from the recorder, review the previously recorded data. The user may select for review a region of the chart strip corresponding to a particular time interval of interest. Alternatively, in a chart recorder in which alarms are set where a process parameter crosses a preset threshold, the user may select for review that region of the chart strip corresponding to the alarm condition or a selected one of a number of detected alarm conditions.

It is a further object of the present invention to provide, in a straightforward manner, a chart recorder having a removable chart cassette. Such an arrangement provides the rapid reloading of a chart recorder at the end of a chart strip. Conversely, the arrangement allows a previously recorded chart strip, remaining on its chart cassette, to be replaced in a chart recorder for review, as outlined above.

It is a feature of typical recording pens or heads that very close tolerances must be observed between the recording head and the location of the chart strip, usually defined by an underlying platen. In the case of a removable chart cassette, in which the recording head remains in the chassis of the chart recorder and the platen is to be found in the removable chart cassette, this need to observe close tolerances between the recording head and the platen may translate into a requirement for precise location of the working position of the removable cassette. Such a design requirement would be expected to increase the manufacturing costs of the chart recorder and to impose a strict maintenance regime.

It is a further object of the present invention to provide for an improved chart recorder which allows for a removable chart cassette at relatively low manufacturing cost and without the need for constant maintenance.

Accordingly, the present invention consists in a further aspect in a chart recorder comprising a chassis; a data input port provided on the chassis; a recording head floatingly supported on the chassis for recording a representation of said data on a chart; a chart cassette removably mounted on the chassis; first chart storage means provided in the chart cassette; chart transport means for the uniform transport of an elongate chart strip from the first storage means past the recording head; a platen on the cassette, positioned so as to support the transported chart strip for recording; head alignment means having two mutually abutting parts, one mounted on the cassette in fixed position relative to the platen and the other floating in the chassis with the recording head; an inspection window enabling visual inspection of a region of the chart strip bearing the recorded data representation; and second chart storage means provided in the chart cassette for collecting the chart strip from the recording head and platen; whereby inter-engagement of the two parts of the head alignment means serves on introduction of the chart cassette into the chassis to align the recording head relatively to the platen.

The ingenious manner in which the recording head is allowed to float relatively to the chassis and is located in position through engagement, direct or indirect, with the platen ensures the necessary close tolerance between the recording head and the platen, whilst admitting relatively large misalignment between the chart cassette and the recorder chassis.

In one arrangement according to the invention, the recording head is slidable along a transverse recording track. The track is carried at its opposite ends on respective lever arms mounted for rotation relatively to the recorder chassis about a common axis and both biased in the pivotal direction bringing the recording head into closer engagement with the platen. Both lever arms are provided with a finger positioned so as to engage an outer region of the platen. Thus as the chart cassette is inserted into the recorder chassis, the two lever arms are rotated through engagement of the corresponding fingers with the platen, and against the bias, to those precise positions required for parallel disposition of the recording track at the required separation from the platen.

In the typical case of a chart strip in roll form, the first and second chart storage means will comprise respective chart rolls. It will be recognised that even a very slight departure from parallelism of the roll axis and the length of the recording platen, will over the considerable length of a typical chart, result in transverse misalignment of the chart strip. Whilst sprocket drive of a chart strip will help to prevent misalignment, a significant transverse misalignment will result in the chart paper leaving the sprocket wheels or the chart paper tearing.

In the case of a removable chart cassette, there is a still more acute difficulty of providing correct alignment and assured parallelism within a structure of reasonable weight and cost.

It is, accordingly, a still further object of the present invention to provide an improved chart recorder having a removable chart cassette in which correct alignment and parallelism of the chart rolls and platen are assured in a simple and economic manner.

Accordingly, the present invention consists in a chart recorder comprising a chassis; a data input port provided on the chassis; a recording head supported on the chassis for recording a representation of said data on a chart; a chart cassette removably mounted on the chassis and comprising two cassette end plates; first chart storage roll means provided in the chart cassette about a first roll axis extending between said end plates; chart transport means for the uniform transport of an elongate chart strip from the first storage roll means past the recording head; a platen on the cassette, positioned so as to support the transported chart strip along a line transverse to the length of the chart strip for recording; and second chart storage roll means provided in the chart cassette about a second roll axis extending between said end plates, for collecting the chart strip from the recording head and platen; wherein said end plates are mounted on the platen and wherein there are provided in the platen, locating abutment means serving to locate the end plates in respective parallel planes so as to ensure parallelism between each of said transverse lines and the first and second roll axes.

Preferably, the platen is formed as an extrusion.

BRIEF DESCRIPTION OF THE DRAWINGS

A specific embodiment of the invention will now be described by way of example with reference to the accompanying drawings in which:

FIG. 9 shows a sectional view through a fixed spool assembly forming part of the cassette;

FIG. 10 shows a sectional view through a removable spool assembly forming part of the cassette.

DETAILED DESCRIPTION OF A SPECIFIC EMBODIMENT

Figure 1:
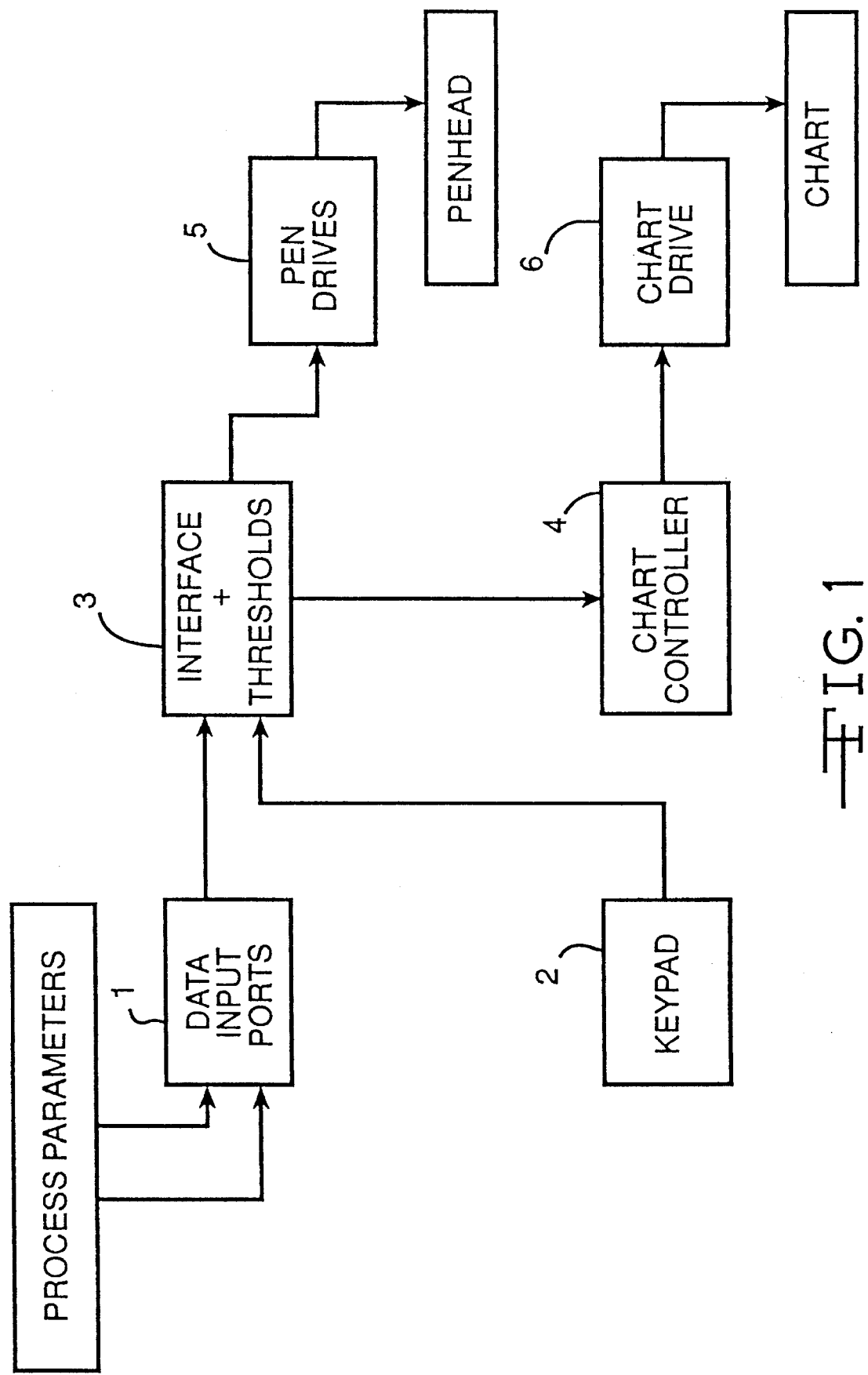
FIG. 1 is a block diagram outlining the different functional elements of a chart recorder according to the present invention.
Figure 2:
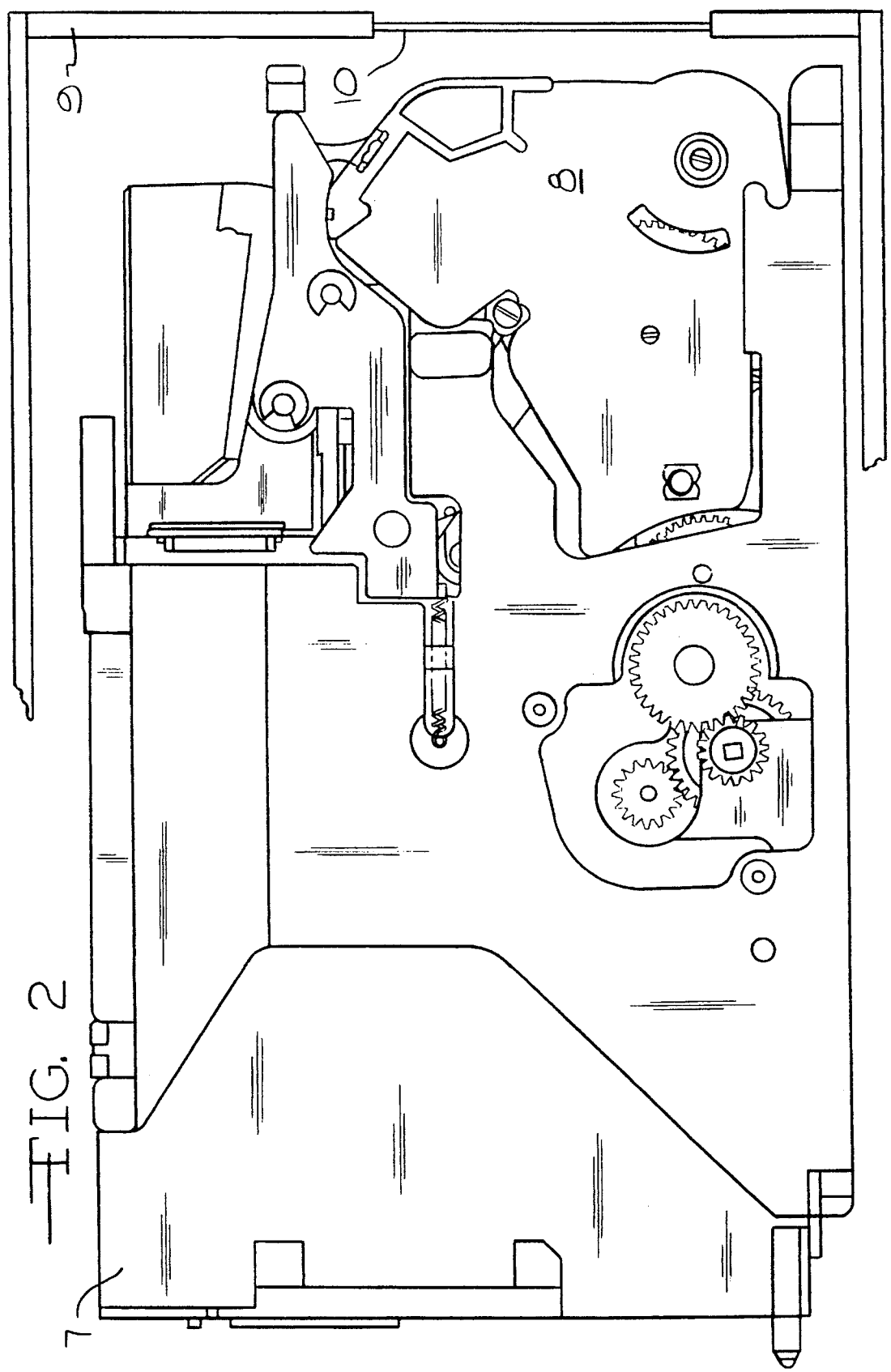
FIG. 2 shows in the side view the main body and the loaded cassette of a chart recorder according to the present invention.

In the preferred embodiment of the invention a chart recorder comprises a data input port (1), pen drive (5), chart controller (4), chart drive (6), keypad (2) and interfacing electronics (3) (FIG. 1). These elements are contained within two separable units shown in FIG. 2, the main body (7) and the cassette (8). An external shell (9), featuring an inspection window (10), encases both the main body and the cassette. The main body houses the motors, the pen and pen drive and the associated electronic circuitry. The main body has two functions: to convert the varying input signals of the process parameters being monitored into the corresponding linear movement of the pen head, and to actuate the flow of chart paper around the system of spools according to user requirements. The cassette accommodates the assembly of gears, spools and rollers and the chart paper.

Figure 3:
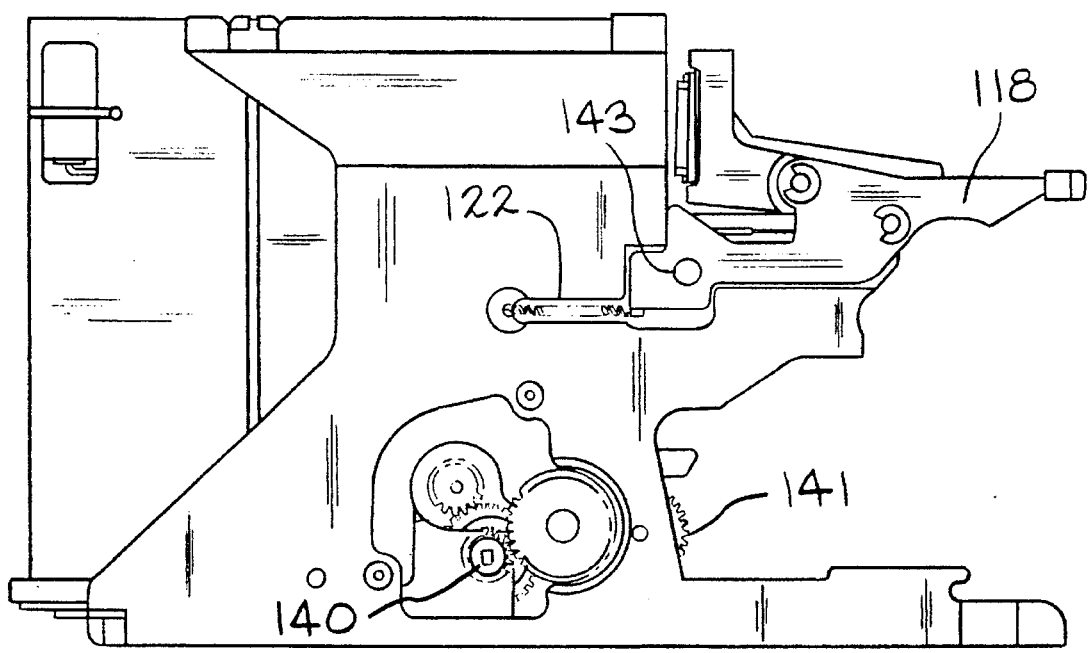
FIG. 3 is a side view of the main body alone, from the recorder of FIG. 2.
Figure 4:
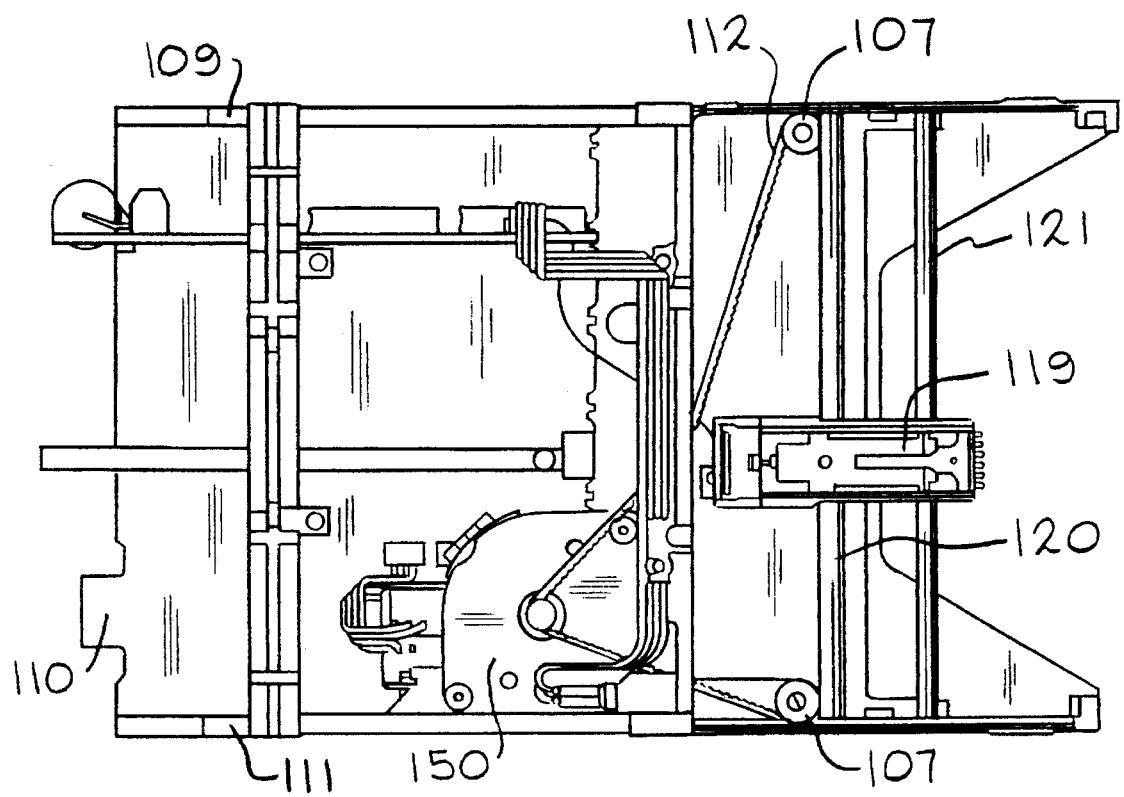
FIG. 4 is a plan elevation of the main body of FIG. 3.

FIGS. 3 and 4 are two orthogonal views of the main body of the chart recorder. The chassis of the main body is constructed from two parallel wall plates (109, 111) upstanding at opposite ends from a base plate (110). Mounted on the base plate (110) are the pen drive and chart paper drive mechanisms, shown generally in FIGS. 2 and 3. Pivoted to each of the wall plates about collinear pivotal axes (143) are respective lever arms (118). Each lever arm comprises a spring anchorage (122) and an opposing crank portion (118) terminating in a finger (127) which extends from the main body. Two linear guide rails (120, 121) extend in parallel between the lever arms (118) and are fixed at their ends in the corresponding crank portions. A pen head (119) slots onto one of the guide rails (120) and simply sits on the other guide rail (121). The head (119) and the track formed by the parallel guide rails (120, 121) float on the pivotal connections of the lever arms (118). The lever arms are biased in the clockwise direction (as seen in FIG. 3) through two tension springs (122) which extend between the spring anchorages and corresponding points in the wall plates.

The principal elements of the pen drive mechanism are a motor (150), the pen head (119), the guide rails (120, 121) and a toothed drive belt (112). The output shaft of the motor connects with the tooth drive belt which is directed in a straight line drive path by two toothed hubs (107). The belt (112) is fixed to the pen head (119). As the output shaft of the motor rotates, it drives the belt which in turn drives the pen head linearly along the length of the guide rail over the chart paper.

The principal elements of the chart paper drive mechanism are: a motor (not shown) coupled to a reduction gearing system (140), whose output gear (141) is positioned to mate with a fixed spool gear on the cassette as will be described.

Figure 11:
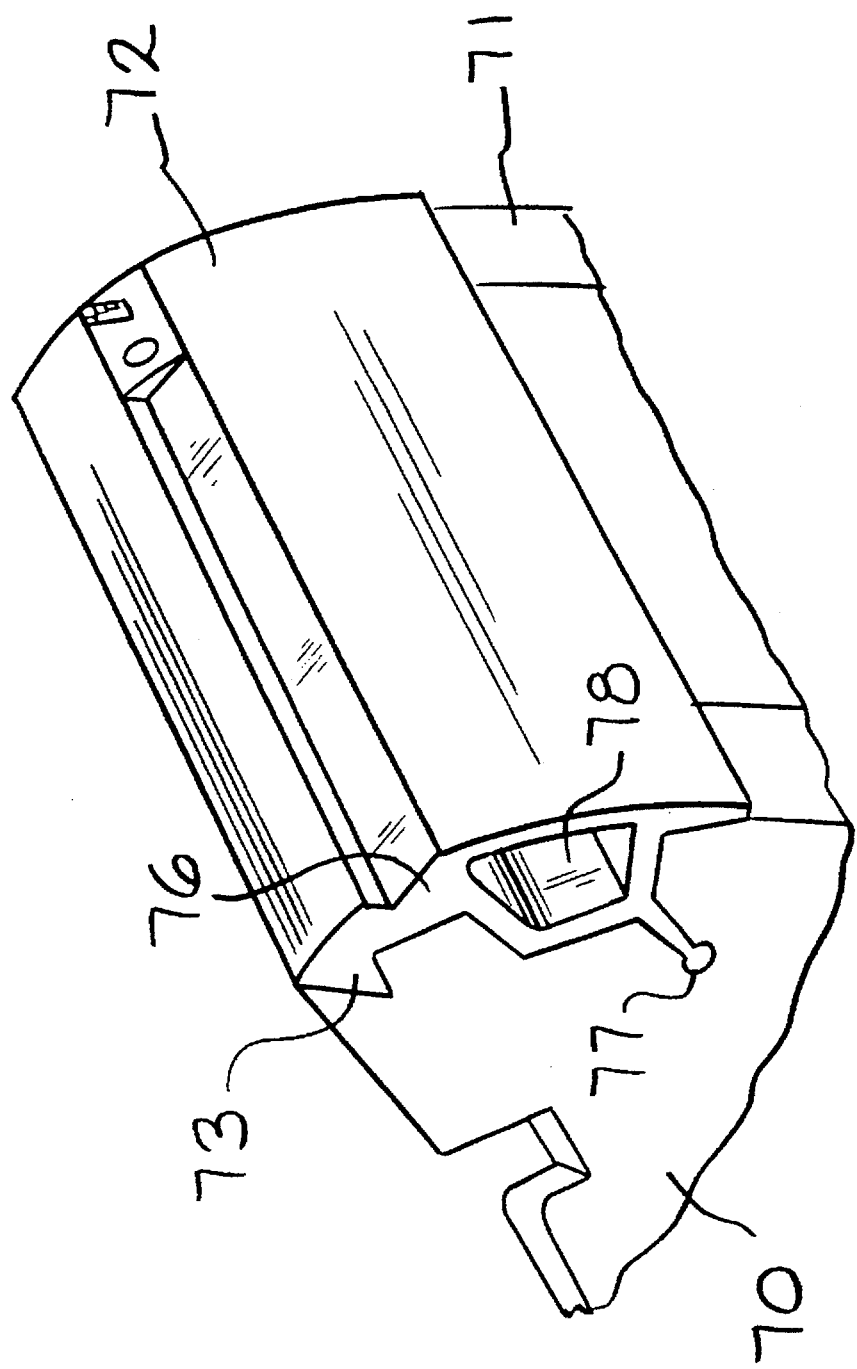
FIG. 11 is a scrap view of a particular external feature of the cassette.

As seen for example in FIG. 11, the cassette comprises two side plates (70, 71) and a platen (72), that is fixed across the two side plates. The side plates may conveniently be formed of plastics material; the platen may be an aluminium extrusion.

Figure 5:
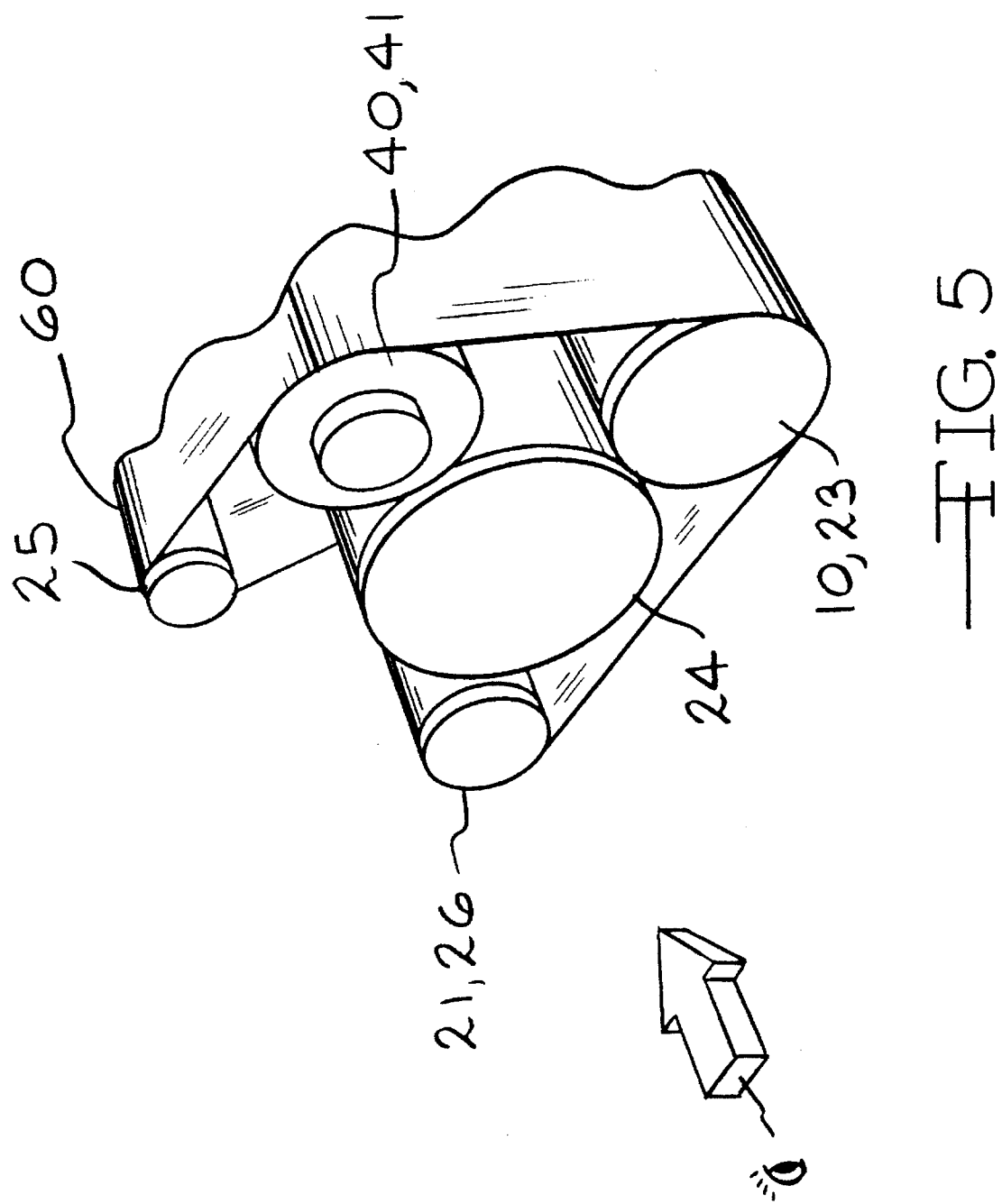
FIG. 5 is a schematic representation of the gear mating arrangement of the cassette shown in FIG. 2.
Figure 6:
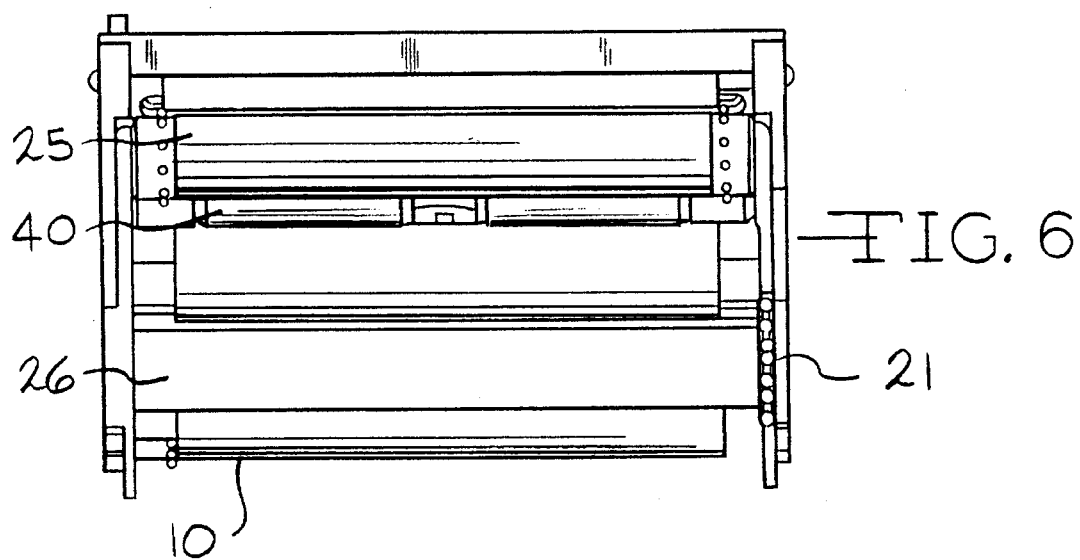
FIG. 6 is a back elevation of a cassette alone, from the recorder of FIG. 2.
Figure 7:
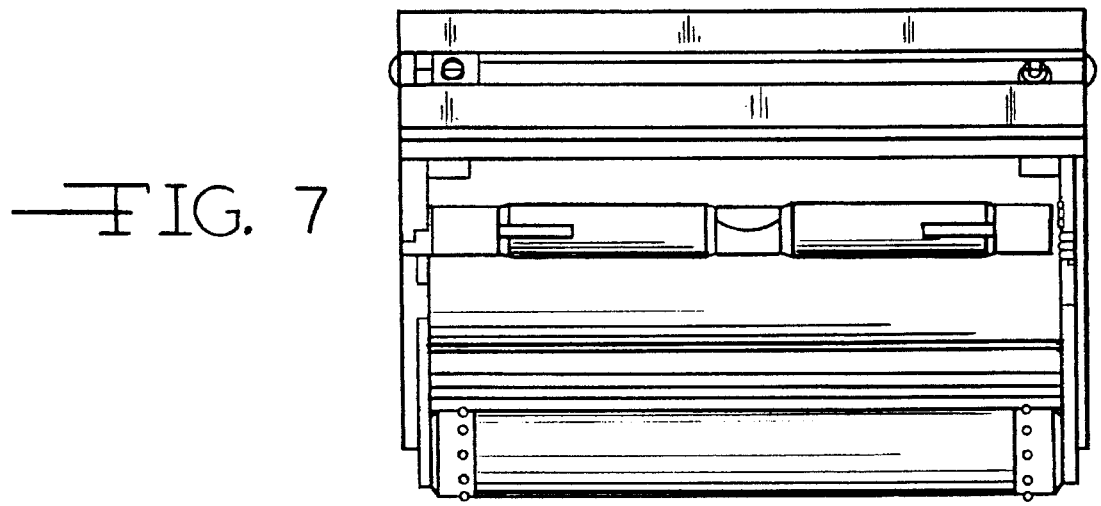
FIG. 7 is a plan elevation of a cassette of FIG. 6.

Referring to FIGS. 5 and 6, the internal components of the cassette comprise a fixed spool (26) and associated gear (21), an idler gear (24), a drive roller (10) and associated gear (23), a jockey roller (25) and a removable spool (40) and associated gear (41). The two spools (26 and 40) and the two rollers (25 and 10) extend perpendicularly between the two side plates, with their respective axes parallel.

The regular rotation of the gears, rollers and spools and the accurate transfer of chart paper from spool to spool is crucial to the correct functioning of the chart recorder. This is assured by the parallelism of the axes of the spools and rollers, which is dependent in turn on the assembly of the two side plates (70, 71) and platen (72).

Figure 8:
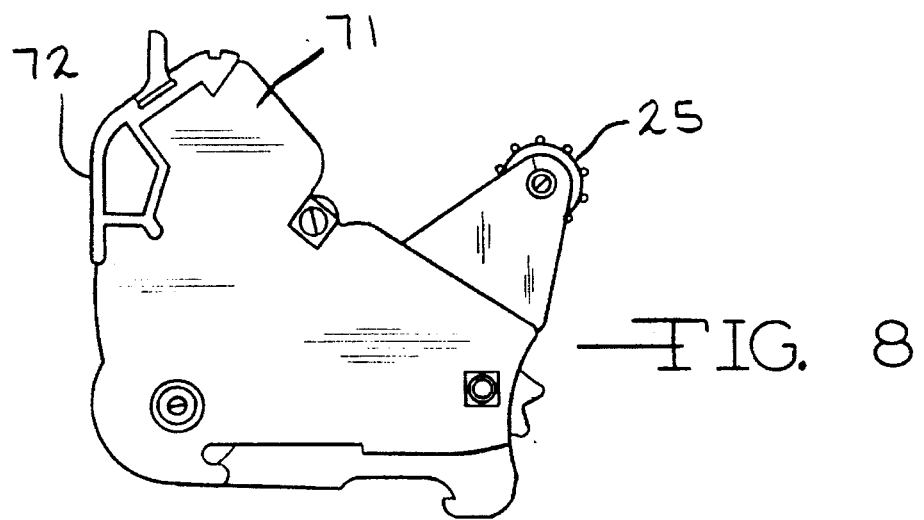
FIG. 8 is a side elevation of a cassette of FIG. 6.

Referring to FIG. 8 and again to FIG. 11, the cross section of the platen (72) provides a locating tooth (73), flanges (74, 75) and, between the flanges a formation (76) comprising a lug (77) at the end of a web formation (78). The two side plates have, in the edge portion abutting the platen, an exactly complementary cut away pattern that mates precisely with the cross section of the platen, effectively fixing the three elements rigidly together; with the planes of the two side plates parallel and at right angles to the platen. This positive interlocking formation alignment thus ensures that the axes of the spools and rollers, which are fixed between the two side plates, are mutually parallel, and perpendicular to the side plates.

Referring to FIG. 9, the fixed spool assembly (26) comprises a centre spindle (29), circlips (30), thrust washers (31), springs (32, 33), one way roller drive elements (28, 38), fixed spool cheeks (34, 35), a casing tube (27) and a rod (36). The centre spindle (29) extends between the two one way elements—the right hand one of which (38) is held against rotation in one of the cassette side plates (72) through a square lug engaging a square cut-out in the side plate (37), the other one way element (28) carries the fixed spool gear (21). The circlips (31) are fixed in annular grooves in the centre spindle. The two springs (32, 33) are compressed between thrust washers which locate at one end against the circlips and at the other end push against and sandwich a cup (34a) of the right hand fixed spool cheek (34). The fixed spool cheeks (34, 35) have three equiangularly spaced arms (only one of which is shown) which are a supporting friction fit with the casing tube (27). The rod (36) extends between the two fixed spool cheeks and serves to anchor the free end of the chart paper.

The components of the removable spool, shown in FIG. 10, and their arrangement have some similarity with that of the fixed spool. A centre spindle (43) extends between two one way drive roller elements (42 and 44), the right hand one of which is held against rotation by the side plate (72); the other one way element (42) carries the removable spool gear (41). Circlips (47a, 47b) are fixed in annular grooves in the centre spindle. Pressing against one of these circlips (47a) is a thrust washer (48a), biased by the left hand end of a spring (49). The other end of this spring pushes against another thrust washer (48b); this in turn provides an axial force that sandwiches a drive clip holder (46) against a third thrust washer (48c) held against a circlip (47b). Attached to the drive clip holder is a drive clip (45), which serves to engage with the inner core of the chart paper roll. Two outer tubes (50) are free to rotate in either direction around the centre spindle, between the drive chip holder and the one way drives, respectively.

Returning to FIG. 5, the gears are arranged such that the output gear (141) from the reduction gearing system of the motor, drives the fixed spool gear (21) in a given direction. The fixed spool gear mates with the idler gear (24) and so its rotation is in an opposite sense relative to the fixed spool gear. The idler gear in turn rotates both the drive roller gear (23) and the removable spool gear (41) in the reverse direction to itself, which clearly, is the same direction of rotation as the driven fixed spool gear.

The roll of chart paper (60) is pushed onto the removable spool with the drive clip engaging the inner core of the chart roll and the chart paper is fed around the system of rollers and spools as shown in FIG. 5 and onto the fixed spool; the free end of the paper being trapped under the rod (36).

The drive roller (10) and the jockey roller (25) are endowed with small protruding pips which mate with sprocket holes in the margins of the chart paper. Depending on the direction in which it is being driven, the drive roller either pulls the chart paper off the removable spool, in the normal operational mode, or off the fixed spool, in the review mode. Now, the working diameter of the drive roller is a constant, unlike the working diameters of the fixed and removable spools which are dependent on the amount of chart paper on the spool. The fixed spool gear driven at a prescribed rate turns the drive roller gear, through the idler gear. The drive roller gear being of constant working diameter draws the chart paper from either the removable spool—in the recording mode—or from the fixed spool—in the review mode—at a fixed prescribed rate.

In the forward motion, that is to say normal recording mode, the motor, via its gear chain (140), drives the fixed spool gear (FIGS. 5 and 9, 21) in a clockwise sense viewed from the eye in FIG. 5. This, through the idler gear (24), in turn drives both the removable spool gear and the drive roller gear (23) clockwise, which draws the chart paper from its roll on the removable spool (40), over the jockey roller (25); this flow of chart paper is then taken up onto the rotating fixed spool tube (FIG. 5, 27).

The fixed spool tube rotates, by virtue of the fixed spool driven gear through the mechanism previously described. Referring to FIG. 9, the fixed spool gear rotates with the one way element (28). In the clockwise direction the left hand one way element (28) effectively clamps the fixed spool spindle (29), driving it too in a clockwise direction. The springs (32) on the fixed spool spindle (29), as has been described, exert an axial force on the thrust washers (31) effectively serving as clutch plates and sandwiching the fixed spool cheek which consequently also rotates clockwise. This of course rotates the casing tube (27) in the same sense, thus drawing chart paper onto it. This whole assembly rotates in the right hand one way element (38) which only permits rotation of the fixed spool spindle in this clockwise direction.

As the diameter of the chart paper on the fixed spool increases, the angular speed of the casing tube decreases to maintain the constant flow of chart paper from the roller drive. This progressive decrease of angular speed is afforded by the slipping of the fixed spool cheek (35) against the axial force of the two thrust washers (31).

Still considering the movement of the paper in the normal recording mode but referring now to FIG. 10, the removable spool gear (41) together with the one way element (42) rotate clockwise around the removable spool spindle, which is constrained to rotate anticlockwise only by the other one way element (44) and so is static. Now the drive clip (45) presses against, and rotates with, the inner wall of the roll of the chart paper, which as mentioned earlier is being drawn by the drive roller. The assembly of circlips (47), thrust washers (48) and spring (49) exert an axially compressive force on the drive clip holder (46). However, as the drive clip holder rotates with the drive clip it slips round against this applied friction. This effectively provides a resistive torque to the drive clip which is transferred through to the chart paper roll. It is this resistive torque that sustains the tension in the chart paper when the rollers are moving in the forward direction.

In the backward direction, that is to say the review operation mode, the principle is similar but reversed: the motor drives the fixed spool gear anti-clockwise which in turn drives the removable spool and drive roller anti-clockwise, so rewinding the chart paper. In this direction the resistive torque that sustains the tension in the chart paper is provided by the slip clutch assembly of the fixed spool, FIG. 9. Here the fixed spool spindle is restrained from rotation by the one way element (36); again the assembly of circlips, springs and thrust washers exert an axial thrust on the fixed spool cheek (34). As the chart paper is pulled off the rotating fixed spool tube, the fixed spool cheek slips against the frictional resistance of the thrust washers and rotates anti-clockwise with the fixed spool tube.

Still in the review direction, the removable spool gear (41) rotates anti-clockwise, this rotates the one way element (42) which effectively grips the removable spool spindle, and rotates in this direction. This in turn rotates the whole assembly mounted on the removable spool spindle including the drive clip holder (46), which transfers this rotation to the chart paper roll, via the drive clip, so taking up the fed chart paper from the drive roller.

Again the slipping arrangement of the drive clip holder (46) between the thrust washers (47(a) and 47(b)) ensures that the chart paper fed from the roller driver is taken up at the required rate.

With these ingenious mechanisms the tension of the paper is constant to ensure smooth transfer of chart paper from spool to spool in both the forward normal recording operational mode or the backward review mode.

The cue and review facility enables the user to review and analyse historical process parameter data quickly and conveniently.

For example, referring back to FIG. 1, if the user wishes to review the last alarm call of a certain process parameter— an alarm call arising when the monitored level of the process parameter reaches or exceeds a threshold present in interface and threshold unit 3—the user would simply depress the appropriate button on the chart recorder keypad (2). The chart controller (4) would then control the chart drive (6) to drive the system of gears and spools in reverse, rewinding the chart paper until the alarm point of interest could be viewed through the inspection window (10). Meanwhile, a buffer memory optionally provided in unit 3 can continue to record the process parameter. Once the user has the information required, the chart controller will, on further command from the keypad, cause the chart to revert to the last recorded point, for recording of the information downloaded from the buffer memory and then continued recording of the monitored process parameter.

It should be understood that this invention has been described by way of example only and a wide variety of modifications can be made without departing from the scope of the invention. Thus, for example, whilst a sprocket assisted roller drive has been described for the strip chart, other arrangements are possible. In the case, for instance, of fan-fold chart paper, the described chart rolls would be replaced by hoppers or appropriate other chart storage means.

Whilst the described arrangement of a primary drive element rotatable in one sense for the transport of the chart paper at a uniform rate for recording, and at increased rate in the opposite sense for review, is much preferred, other means can be employed for bringing a selected region of the chart strip into register with the inspection region. Similarly, the use of one way drives and slipping clutches offers an elegant and compact mechanism, but is not the only solution.

In the case of a removable chart cassette, it will be recognised that the described fingers biased into contact with the platen are but an example of respective abutting parts associated respectively with the recording track and the platen serving to bring the recording head to the correct position. Moreover, a linear track for the recording head can be constituted in ways other than the described parallel guide rails extending between pivotal lever arms.

Finally, it should be mentioned that whilst the chosen example of a process control chart recorder is important, it is not the only area of application for chart recorders according to this invention.

We claim:

1. A chart recorder comprising a data input port for receiving data; a recording station for recording a representation of said data on a chart; first chart storage means for storing an elongate chart strip; chart transport means for uniform transport of the elongate chart strip from the first storage means past the recording station; an inspection window enabling visual inspection of a region of the chart strip bearing the recorded data representation; and second chart storage means for collecting the chart strip from the recording station; wherein there is provided a chart review controller and chart review means operable through the chart review controller for transporting the chart strip under tension from the second chart storage means to the first chart storage means, in such a manner as to bring into register with the inspection window, for display, a selected region of the chart strip bearing previously recorded data representation.

2. A recorder according to claim 1, wherein threshold means are provided for detecting crossing of a preset threshold by said recorded data at a first position on the chart strip and wherein the chart review controller on demand transports the chart strip to bring said first position on the chart strip into register with the inspection window.

3. A recorder according to claim 1 or claim 2, wherein the chart review means is adapted, after said review, to return the chart strip for continued data recording.

4. A chart recorder according to claim 1, wherein said first chart storage means comprises a first chart roll means for receiving a chart strip in roll form; said chart transport means comprises a chart drive roller and said second chart storage means comprises a second chart roll means for collecting the chart strip from the recording station.

5. A recorder according to claim 4, wherein a primary drive element is connected with the chart drive roller so as selectively to drive the chart drive roll in a forward direction for uniform transport of the chart strip past the recording station and, at increased angular velocity, in a reverse direction so as to transport the chart strip from the second chart roll means to the first chart roll means.

6. A recorder according to claim 5, wherein first and second variable drive connections are provided between the primary drive element and respectively, the first and second chart roll means, said first variable drive connection providing for, in the forward direction of drive of the primary drive element, rotation of the first chart roll means to provide for tensioned take-off of the chart strip from said first chart roll means and, said second variable drive connection providing for in the reverse direction of drive of the primary drive element slipping drive rotation of the second chart roll means to provide for tensioned take-up of the chart strip onto said first chart roll means at an angular velocity varying with length of chart strip already taken up.

7. A recorder according to claim 5 or claim 6, wherein each of the first and second chart roll means comprises an axle, there being provided a one way coupling at one axial end between the axle and the chassis and, at the other axial end, a one way coupling between the axle and a drive gear disposed in engagement with said primary drive element.

8. A recorder according to claim 7, wherein the axle for the respective first and second chart roll means comprises a spindle extending through respective chart roll means.

9. A recorder according to claim 6, wherein the variable drive connection comprises a clutch providing for rotation respective chart roll means of an angular velocity at or below that of an associated drive gear.

10. A recorder according to claim 9, wherein said clutch comprises clutch plates biased axially of respective chart roll means.

11. A chart recorder comprising a chassis; a data input port for receiving data, provided on the chassis; a recording head supported on the chassis for recording a representation of said data on a chart; a chart cassette removably mounted on the chassis; first chart storage means provided in the chart cassette for storing an elongate chart strip; chart transport means for uniform transport of the elongate chart strip from the first storage means past the recording head; a platen on the cassette, positioned so as to support the transported chart strip in the appropriate position with respect to the recording head for recording; an inspection window enabling visual inspection of a region of the chart strip bearing the recorded data representation; and second chart storage means provided in the chart cassette for collecting the chart strip from the recording head and platen; wherein there is provided a chart review controller and chart review means operable through the chart review controller for transporting the chart strip from the second chart storage means to the first chart storage means, in such a manner as to bring into register with the inspection window, for visual inspection, a selected region of the chart strip bearing previously recorded data representation.

12. A recorder according to claim 11, wherein the cassette is a push fit within the chassis.

13. A recorder according to claim 11, wherein threshold means are provided for detecting crossing of a preset threshold by said recorded data at a first position on the chart strip and wherein the chart review controller on demand transports the chart strip to bring said first position on the chart strip into register with the inspection window.

14. A recorder according to claim 11 or claim 13, wherein the chart review means is adapted, after said review, to return the chart strip for continued data recording.

15. A chart recorder according to claim 11, wherein said first chart storage means comprises a first chart roll means for receiving a chart strip in roll form; said chart transport means comprises a chart drive roller and said second chart storage means comprises a second chart roll means for collecting the chart strip from the recording station.

16. A recorder according to claim 15, wherein a primary chassis drive element is engageable with a primary cassette drive element in turn connected with the chart drive roller so as selectively to drive the chart drive roll in a forward direction for uniform transport of the chart strip past the recording station and, at increased angular velocity, in a reverse direction so as to transport the chart strip from the second chart roll means to the first chart roll means.

17. A recorder according to claim 16, wherein first and second variable drive connections are provided between the cassette primary drive element and each of the first and second chart roll means, said first variable drive connection providing for, in the forward direction of drive of the cassette primary drive element, rotation of the first chart roll means to provide for tensioned take-off of the chart strip from the said first chart roll means and, said second variable drive connection providing for in the reverse direction of drive of the cassette primary drive element slipping drive rotation of the second chart roll means to provide for tensioned take-up of the chart strip onto said first chart roll means at an angular velocity varying with length of chart strip already taken up.

18. A recorder according to claim 15 or claim 17, wherein each of the first and second chart roll means comprises an axle, there being provided a one way coupling at one axial end between the axle and the chassis and, at the other axial end, a one way coupling between the axle and a drive gear disposed in engagement with said primary drive element.

19. A recorder according to claim 18, wherein the axle for the respective first and second chart roll means comprises a spindle extending through respective chart roll means.

20. A recorder according to claim 17, wherein the variable drive connection comprises a clutch providing for rotation of respective chart roll means of an angular velocity at or below that of an associated drive gear.

21. A recorder according to claim 20, wherein said clutch comprises clutch plates biased axially of respective chart roll means.

22. A chart recorder comprising a chassis; a data input port for receiving data provided on the chassis; a recording head floatingly supported on the chassis for recording a representation of said data on a chart; a chart cassette removably mounted on the chassis; first chart storage means for storing an elongate chart strip provided in the chart cassette; chart transport means for uniform transport of the elongate chart strip from the first storage means past the recording head; a platen on the cassette, positioned so as to support the transported chart strip for recording; head alignment means having two mutually abutting parts, one mounted on the cassette in fixed position relative to the platen and the other floating in the chassis with the recording head; an inspection window enabling visual inspection of a region of the chart strip bearing the recorded data representation; and second chart storage means provided in the chart cassette for collecting the chart strip from the recording head and platen; whereby inter-engagement of the two parts of the head alignment means serves on introduction of the chart cassette into the chassis to align the recording head relatively to the platen.

23. A recorder according to claim 22 wherein the recording head is mounted for controlled transverse movement along a recording track, the recording track being floatingly supported on the chassis.

24. A recorder according to claim 23, wherein the recording track is floatingly supported on the chassis by means of a pair of lever arms pivotally mounted on the chassis for independent pivotal movement about a common pivotal axis.

25. A recorder according to claim 24, wherein said abutting part floating in the chassis with the recording head comprises a finger provided on each of said lever arms.

26. A recorder according to claim 24, Wherein both lever arms are biased in a rotational sense bringing said abutting parts into engagement.

27. A recorder according to claim 24, wherein track means comprises first and second guide rails transversely extending between said lever arms.

28. A recorder according to claim 27, wherein said recording head is rockably connected to said first guide rail and in operation rests on said second guide rail.

29. A recorder according to claim 22, wherein a transverse groove is formed in said platen such that an air cushion is provided beneath said chart strip opposite said recording head.

30. A chart recorder comprising a chassis; a data input port for receiving data provided on the chassis; a recording head supported on the chassis for recording a representation of said data on a chart; a chart cassette removably mounted on the chassis and comprising two cassette end plates; first chart storage roll means for storing an elongate chart strip provided in the chart cassette about a first roll axis extending between said end plates; chart transport means for uniform transport of the elongate chart strip from the first storage roll means past the recording head; a platen on the chart cassette, positioned so as to support the transported chart strip along a line transverse to a length of the chart strip for recording; and second chart storage roll means provided in the chart cassette about a second roll axis extending between said end plates, for collecting the chart strip from the recording head and platen; wherein said end plates are mounted on the platen and wherein there is provided in the platen, locating abutment means serving to locate the end plates in respective parallel planes so as to ensure parallelism between each of said transverse line and the first and second roll axes.

31. A recorder according to claim 30, wherein said locating abutment means provides at least two point contact between the platen and each end plate.

32. A recorder according to claims 30 or 31, wherein the locating abutment means serves to provide for interlocking connection between the platen and each end plate.

33. A recorder according to claim 30, wherein each end plate extends, at least in a region of the platen, a significant distance in a direction along said transverse line.

34. A recorder according to claim 30, wherein said plate is of uniform cross section.

35. A method of chart recording, comprising the steps of receiving data; uniformly transporting an elongate chart strip past a recording station in a first direction along a length of the chart strip; recording at the recording station a representation of said data on the chart strip; collecting the chart strip bearing the recorded data representation and, periodically on demand, transporting the chart strip in any direction opposite to said first direction in such a manner as to bring into register with an inspection window, a selected region of the chart strip bearing previously recorded data representation, for review.

36. A chart recorder comprising a data input port for receiving data; a recording station for recording a representation of the data on a chart at a current recording chart location; first chart storage means for storing an elongate chart strip; second chart storage means for collecting the chart strip from the recording station; an inspection window enabling visual inspection of a region of the chart strip bearing the recorded data representation; chart actuation means for transporting the elongate chart strip between said first and second chart storage means; a chart controller for operating said chart actuation means in such a manner as to transport the chart to bring into register with the inspection window for visual display any selected region of the chart strip and to return the chart strip to bring the current recording chart location back into register with the inspection window.

37. A recorder according to claim 36, wherein said chart actuation means comprises a single drive arrangement operable in one sense to the chart under tension from the first sheet storage means to the second chart storage means and operable in another sense to drive the chart under tension from the second chart storage means to the first chart storage means.

* * * * *